US009145500B2

(12) United States Patent
Popa et al.

(10) Patent No.: US 9,145,500 B2
(45) Date of Patent: Sep. 29, 2015

(54) SILOXANE-URETHANE FOUL RELEASE COATINGS

(71) Applicant: Dow Global Technologies LLC, Midland, MI (US)

(72) Inventors: Paul J. Popa, Auburn, MI (US); Yanxiang Li, Midland, MI (US); Hongyu Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 97 days.

(21) Appl. No.: 14/132,119

(22) Filed: Dec. 18, 2013

(65) Prior Publication Data

US 2014/0186621 A1 Jul. 3, 2014

(30) Foreign Application Priority Data

Dec. 31, 2012 (CN) .......................... 2012 1 0599271

(51) Int. Cl.

| | | |
|---|---|---|
| *C09D 7/12* | (2006.01) | |
| *C08G 18/61* | (2006.01) | |
| *C08G 18/77* | (2006.01) | |
| *C08G 18/10* | (2006.01) | |
| *C09D 175/04* | (2006.01) | |

(52) U.S. Cl.
CPC .............. *C09D 7/1233* (2013.01); *C08G 18/10* (2013.01); *C08G 18/61* (2013.01); *C08G 18/77* (2013.01); *C09D 175/04* (2013.01); *Y10T 428/269* (2015.01); *Y10T 428/31551* (2015.04)

(58) Field of Classification Search
None
See application file for complete search history.

(56) References Cited

U.S. PATENT DOCUMENTS

| 4,684,538 | A * | 8/1987 | Klemarczyk | ................. 427/515 |
|---|---|---|---|---|
| 4,902,767 | A | 2/1990 | Roitman et al. | |
| 5,820,491 | A | 10/1998 | Hatch et al. | |
| 6,291,599 | B1 * | 9/2001 | Yang et al. | ..................... 525/476 |
| 6,545,114 | B1 * | 4/2003 | Yang et al. | ....................... 528/26 |
| 7,799,434 | B2 | 9/2010 | Webster et al. | |
| 2009/0017288 | A1 | 1/2009 | Webster et al. | |
| 2010/0003211 | A1 | 1/2010 | Sakamoto | |
| 2012/0273122 | A1 * | 11/2012 | Majumdar et al. | ............ 156/230 |
| 2013/0281614 | A1 * | 10/2013 | Bartley et al. | ................. 524/588 |

FOREIGN PATENT DOCUMENTS

| EP | 0442272 | A2 | 8/1991 |
|---|---|---|---|
| EP | 2058355 | A1 | 5/2009 |
| GB | 2039511 | A | 8/1980 |
| WO | 9006958 | A1 | 6/1990 |
| WO | 9313179 | A1 | 7/1993 |
| WO | 2008008077 | A2 | 1/2008 |
| WO | 2009025924 | A2 | 2/2009 |

* cited by examiner

Primary Examiner — Robert S Loewe
(74) Attorney, Agent, or Firm — Karl E. Stauss

(57) ABSTRACT

A two-part moisture curable coating compositions capable of forming polyurethane-polysiloxane networks is provided. The coating compositions which are useful in marine antifouling coatings provide a two-part moisture curable composition comprising: (a) a first part comprising at least one multifunctional polyol; (b) a second part comprising: (i) at least one polysiloxane polymer with at least two isocyanate or mercapto functional groups and (ii) at least one isocyanate functional organic compound; and (c) solvent. Also provided are methods of coating substrates with the curable composition and articles produced from such coated substrates.

14 Claims, No Drawings

SILOXANE-URETHANE FOUL RELEASE COATINGS

This invention relates to two-part moisture curable coating compositions capable of forming polyurethane-polysiloxane networks. The coating compositions are useful in the field of marine antifouling coatings.

Bio-fouling occurs everywhere in the marine environment and is a significant problem for marine objects, such as ships. One approach to limit fouling microorganisms from accumulating is to use self-cleaning foul releasing coatings based on silicone elastomers. Polydimethylsiloxane (PDMS) based silicone elastomer foul release coatings have a rubbery elasticity, a low surface energy and a smooth surface; making it easier for marine organisms to detach from the coating surface under shear stress generated by hydrodynamic drag. However, PDMS is soft, easily wears off, and requires frequent reapplications; thereby costing time and money to maintain.

One effective approach to improve the mechanical properties of PDMS based silicone coating is to blend PDMS with other polymers with better mechanical properties, such as polyurethane (PU). Polysiloxanes and polyurethanes possess very different, but highly useful, physical and mechanical properties which have led to their widespread use. Polyurethanes stand out by virtue of mechanical strength, elasticity, adhesion resistance and abrasion resistance when combined with polydimethylsiloxane in foul releasing coatings. However uniform physical blends of polysiloxanes and polyurethanes are difficult to obtain, due to incompatible properties of these resins and their pronounced tendency to undergo phase separation following initial admixture.

U.S. Pat. No. 8,299,200 (claiming priority to the international patent published as WO2009/025924) discloses a polysiloxane-modified polyurethane coating prepared by reacting a mixture comprising polyisocyanate; polyol; and polysiloxane having functional groups capable of reacting with the polyisocyanate. The functional groups capable of reacting with the polyisocyanate are attached to only a single end of the polyorganosiloxane chain. It is theorized that coatings that have a polysiloxane tethered at only one end, can result is a highly mobile surface and may permit easier release of fouling organisms. However, such siloxanes are expensive and coatings prepared with this system fail to exhibit all the required performance parameters of coatings in a marine environment. U.S. Pat. No. 5,820,491 discloses a two-part urethane topcoat including a polyol component, an isocyanate component and a hydroxyl functional, polyether-modified polysiloxane copolymer component. Coatings prepared with this system fail to exhibit all the required performance parameters of coatings in a marine environment. What is needed is an alternative, inexpensive, simple and uniform coating composition that blends the properties of both PDMS and PU and meets or exceeds the required performance parameters of coatings in a marine environment.

The present invention provides a two-part moisture curable composition comprising: (a) a first part comprising at least one multifunctional polyol; (b) a second part comprising: (i) at least one polysiloxane polymer with at least two isocyanate functional groups and (ii) at least one isocyanate functional organic compound; and (c) solvent. The present invention further provides a method of coating a substrate comprising: (a) forming a two-part moisture curable composition comprising: (i) a first part comprising at least one multifunctional polyol; (ii) a second part comprising: (A) at least one polysiloxane polymer with at least two isocyanate functional groups and (B) at least one isocyanate functional organic compound; and (iii) solvent; (b) optionally blending in one or more of pigments, dyes, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations thereof; and (c) applying the composition of steps (a) and (b) to a substrate and curing the composition.

The present invention further provides a two-part moisture curable composition comprising: (a) a first part comprising: (i) at least one multifunctional polyol and (ii) at least one polysiloxane polymer with at least two mercapto functional groups; (b) a second part comprising at least one isocyanate functional organic compound; and (c) solvent. The present invention further provides a method of coating a substrate comprising: (a) forming a two-part moisture curable composition comprising: (i) a first part comprising: (A) at least one multifunctional polyol and (B) at least one polysiloxane polymer with at least two mercapto functional groups; (ii) a second part comprising at least one isocyanate functional organic compound; and (iii) solvent; (b) optionally blending in one or more of pigments, dyes, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations thereof; and (c) applying the composition of steps (a) and (b) to a substrate and curing the composition.

The term "polyol" is an alcohol molecule containing multiple hydroxyl groups. The term "multifunctional polyol" means a polyol that has more than one reactive site capable of cross-linking. The term "polyurethane" means a resin in which the polymer units are linked by urethane linkages, i.e., —O—CO—NH—, and/or one or more urea linkages, i.e., —NH—CO—NH—. The term "isocyante" means a functional group with the formula —N=C=O. The term "mercapto" means a functional group with the formula —SH, which may also be referred to as a thiol group.

The polysiloxane polymer of the present invention has the formula:

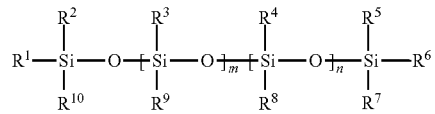

wherein each $R^1$, $R^2$, $R^3$, $R^4$, $R^5$, $R^6$, $R^7$, $R^8$, $R^9$, or $R^{10}$ group is independently selected from substituted or unsubstituted $C_1$ to $C_{60}$ hydrocarbon radicals, provided that (i) at least one of the $R^1$ through $R^{10}$ groups is substituted with an isocyanate functional group or a mercapto group and (ii) the polysiloxane polymer has at least two isocyante or mercapto functional groups. Preferably, at least one of the $R^1$ through $R^{10}$ groups is substituted with an isocyanate functional group and the polysiloxane polymer has at least two isocyante functional groups. Each of m and n is independently an integer from 0 and above, provided that $m+n \geq 1$. Preferably, the isocyanate functional polysiloxane has a number average molecular weight in the range of from 4,000 to 15,000, more preferably from 6,000 to 10,000. The number average molecular weight is determined by GPC Viscotek VE2001 using a Mixed D column and polystyrene standard. Examples of suitable isocyanate functional polysiloxanes include without limitation, Silmer® Di-50 and D-100 materials from Siltech Corp., which are linear-difunctional polysiloxanes represented by the formula:

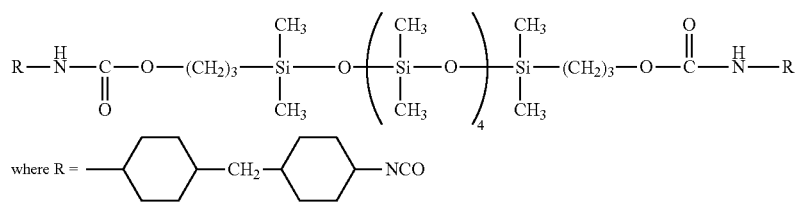

where a≥1 and Silmer® C50 from Siltech Corp., a multi-functional polysiloxane represented by the formula:

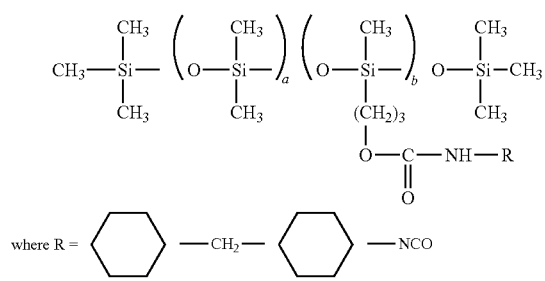

where a≥1 and b>1.

The polysiloxane polymer of the present invention makes up from 2 to 40 weight percent based on the total solids weight of the curable composition (i.e. excluding the solvent used in the curable composition). Preferably the polysiloxane polymer is from 5 to 30 weight percent based on the total solids weight of the curable composition and most preferably from 10 to 25 weight percent based on the total solids weight of the curable composition.

The multi-functional polyol of the present invention may be selected from acrylic polyols, natural oil polyols, polyester polyols, polyether polyols, polycarbonate polyols, and blends thereof. Acrylic polyols are preferred. Suitable acrylic polyols include acrylic polymers that range in Tg from 0-45° C. preferably from 10-40° C., and most preferably 20-35° C. and have number average molecular weights (Mn) in the range of 2,000-25,000 g/mol, preferably 3,000-15,000 g/mol and most preferably 4,000-8,000 g/mol. Examples of commercially available suitable acrylic polyols include Paraloid™ AU-750 from The Dow Chemical Company, Paraloid™ AU-830 from The Dow Chemical Company, Desmophen® A365 from Bayer Material Science AG, and Joncryl® 500 from BASF Corporation. The multi-functional polyol of the present invention makes up from 35 to 60 weight percent based on the total weight of the curable composition. Preferably the multi-functional polyol is from 40 to 55 weight percent based on the total weight of the curable composition and most preferably from 40 to 50 weight percent based on the total weight of the curable composition. The glass transition temperature ("Tg" herein) of the acrylic polymers are measured using a DSC from TA Instruments Model Q100 V9.8 Build 296 with a standard Cell FC.

Suitable natural oil polyols (NOPs) include non-modified NOPs, such as, for example, natural seed oil diol monomers; and modified NOPs, such as, for example, commercially available Gen 1 NOP DWD 2080 from The Dow Chemical Company, which are reconstructed NOP molecules with the monomers of saturated, mono-hydroxyl, bi-hydroxyl and tri-hydroxyl methyl esters at a weight ratio of approximately 32%, 38%, 28% and 2%. In another example, a commercially available Gen 4 NOP is obtained by reacting Unoxol™ diol and seed oil diol monomers which are separated from seed oil monomer. Unoxol™ diol is a mixture of cis, trans-1,3- and cis, trans-1,4-cyclohexane dimethanol, and is available from The Dow Chemical Company. The Gen 4 NOP has following structure with the hydroxyl equivalent weight of 170 g/mol.

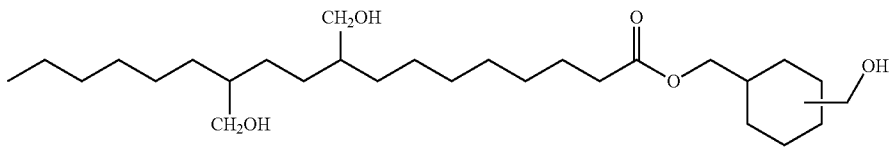

The natural oil derived polyols are polyols based on or derived from renewable feedstock resources such as natural and/or genetically modified plant vegetable seed oils and/or animal source fats. Such oils and/or fats are generally comprised of triglycerides, that is, fatty acids linked together with glycerol. Preferred are vegetable oils that have at least about 70 percent unsaturated fatty acids in the triglyceride. The natural product may contain at least about 85 percent by weight unsaturated fatty acids. Examples of preferred vegetable oils include, but are not limited to, for example, those from castor, soybean, olive, peanut, rapeseed, corn, sesame, cotton, canola, safflower, linseed, palm, grapeseed, black caraway, pumpkin kernel, borage seed, wood germ, apricot kernel, pistachio, almond, macadamia nut, avocado, sea buckthorn, hemp, hazelnut, evening primrose, wild rose, thistle, walnut, sunflower, jatropha seed oils, or a combination thereof.

Additionally, oils obtained from organisms such as algae may also be used. Examples of animal products include lard, beef tallow, fish oils and mixtures thereof. A combination of vegetable and animal based oils/fats may also be used.

The average hydroxyl functionality of the NOP is in the range of from 1 to 10; preferably in the range of from 2 to 6. The NOP may have a number average molecular weight in the range of from 100 to 3,000; preferably from 300 to 2,000; and more preferably from 350 to 1,500.

Suitable isocyanate functional organic compounds include aliphatic or cycloaliphatic polyisocyanates such as hexamethylene diisocyanate (HDI), isophorone diisocyanate (IPDI), methylen bis(p-cyclohexyl isocyanate) ($H_{12}$MDI), meta-tetramethylxylene diisocyanate (m-TMXDI), cyclohexyl diisocyanate (CHDI), 1,3-bis(isocyanatomethyl)cyclohexane and 1,4-bis(isocyanatomethyl)cyclohexane; trimers of diisocyanates such as the trimer of hexamethylene diisocyanate (HDI) sold under the trademark Desmodur®N-3390 from Bayer MaterialScience AG, the trimer of isophorone diisocyanate (IPDI) sold under the tradename Tolanate® IDT-70 from Perstorp Polyols, Inc., and blends thereof. Preferably the isocyanate functional organic compounds are trimers of hexmethylene diisocyanate (HDI) and isophorone diisocyanate (IPDI); and most preferably trimers of hexamethylene diisocyanate (HDI). The isocyanate functional organic compounds of the present invention make up from 8 to 30 weight percent based on the total weight of the curable composition. Preferably isocyanate functional organic compounds are from 10 to 30 weight percent based on the total weight of the curable composition and most preferably from 15 to 25 weight percent based on the total weight of the curable composition.

Suitable urethane grade solvents include aromatic hydrocarbons such as xylene, toluene; ketones such as methyl isobutyl ketone, methyl amyl ketone, or acetone, esters such as butyl acetate, or hexyl acetate; glycol ether esters such as propylene glycol monomethyl ether acetate; esters such as propyl propionate or butyl propionate, and blends thereof. The solvent makes up from 10 to 60 weight percent based on the total weight of the curable composition. Preferably solvent is from 15 to 50 weight percent based on the total weight of the curable composition and most preferably from 20 to 40 weight percent based on the total weight of the curable composition.

The curable compositions are useful as coatings and may include various additives ordinarily incorporated in compositions of this type. Examples of additional additives include, but are not limited to, pigments, dyes, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations including one or more of the foregoing additives.

Suitable adhesion promoters include silane adhesion promoters, such as 3-glycidoxypropyl trimethoxysilane, which can enhance the wet adhesion of the fouling release top coat without the need for a mid or tie coat. Preferably the silane adhesion promoter is in the range of from 0.5 to 3 weight percent based on the total weight of the curable composition, more preferably from 1 to 3 weight percent based on the total weight of the curable composition, and most preferably from 1.5 to 3 weight percent based on the total weight of the curable composition.

Curable coating compositions of the present invention can be un-pigmented transparent clear coats, or pigmented systems for primer, basecoat and topcoat applications. The pigment may be any typical organic or inorganic pigment. Several different pigments may be needed to achieve a desirable color for a particular application. Examples of suitable pigments include without limitation, titanium dioxide, barytes, clay, calcium carbonate, red iron oxide, CI Pigment Yellow 42, CI Pigment Blue 15, 15:1, 15:2, 15:3, 15:4 (copper phthalocyanines), CI Pigment Red 49:1, CI Pigment Red 57:1 and carbon black.

The resulting coating compositions can be applied onto a substrate using techniques known in the art; e.g. by spraying, draw-down, roll-coating. The nominal dry film thickness (DFT) of the coating is greater than or equal to 2 mils, preferably greater than 2.5 mils and more preferably greater than 3 mils. Examples of substrates that may be coated include without limitation, plastics, wood, metals such as aluminum, steel or galvanized sheeting, tin-plated steel, concrete, glass, composites, urethane elastomers, primed (painted) substrates, and the like. The coatings can be cured at room temperature or at an elevated temperature in a forced air oven or with other types of heating sources.

The following examples are illustrative of the invention.

EXPERIMENTAL METHODS

The raw materials used in the Examples are described below.

Raw Materials

| Material | Function | Supplier |
| --- | --- | --- |
| Acrylic Polyol A comprises by weight, in polymerized form, 42% methyl methacrylate (MMA), 30% hydroxyethylmethacrylate (HEMA) and 28% butyl acrylate (BA), with a Tg of 31° C., a solution hydroxyl equivalent weight of 552 at 80.3% solids and a Mn of 4600. | Polyol | Synthesized in laboratory. |
| Acrylic Polyol B comprises by weight, in polymerized form, 30% MMA, 30% HEMA and 40% BA, with a Tg of 14° C., a solution hydroxyl equivalent weight of 551 at 76.4% solids and a Mn of 3800. | Polyol | Synthesized in laboratory. |
| Acrylic Polyol C comprises by weight, in polymerized form, 16% MMA, 30% HEMA and 54% BA, with a Tg of −3° C., a solution hydroxyl equivalent weight of 557 at 73.1% solids and a Mn of 5000. | Polyol | Synthesized in laboratory. |
| Acrylic Polyol D is the same composition as Acrylic Polyol A, but with a solution hydroxyl equivalent weight of 610 at 77.5% solids and a Mn of 3500. | Polyol | Synthesized in laboratory. |
| Polyester 1 (Natural Oil Polyol) with a solution hydroxyl equivalent weight of 170 at 77.5% solids | Polyol | The Dow Chemical Company |
| Polyester 2 (CAPA ™ 3091 polycaprolactone), CAS Number 37625-56-2 with a molecular weight of 900. | Polyol | Perstorp Polyols, Inc. |

| Material | Function | Supplier |
|---|---|---|
| Polyester 3 (CAPA ™ 3050 polycaprolactone), CAS Number 37625-56-2 with a molecular weight of 540. | Polyol | Perstorp Polyols, Inc. |
| Silmer ® NCO Di-50, molecular weight of 4300 g/mol according to manufacturer | Isocyanate functional PDMS | Siltech Corp. |
| Silmer ® NCO Di-100, molecular weight of 8000 g/mol according to manufacturer | Isocyanate functional PDMS | Siltech Corp. |
| Silmer ® NCO C-50, molecular weight of 12,400 g/mol according to the manufacturer | Isocyanate functional PDMS | Siltech Corp. |
| Desmodur ® N3390 aliphatic polyisocyanate (HDI Trimer 90% solids in butyl acetate) | Isocyanate functional organic compound | Bayer MaterialScience AG |
| Tolanate ® IDT-70 aliphatic polyisocyante (IPDI Trimer 70% Solids in butyl acetate) | Isocyanate functional organic compound | Perstorp Polyols, Inc. |
| Siloxane 1 (MCR-C62 mono-dicarbinol terminated polydimethylsiloxane), with a molecular weight of 5,000 | Hydroxy functional PDMS | Gelest, Inc. |
| Siloxane 2 (Dow Corning ® 54 Additive dimethyl, methyl(polypropylene oxide) siloxane), CAS Number 68957-00-6, | Hydroxy functional siloxane | Dow Corning Corporation |
| Siloxane 3 (Dow Corning ® 29 Additive octamethylcyclotetrasiloxane and decamethylcyclopentasiloxane), CAS Numbers 556-67-2 and 541-02-6 | Hydroxy functional siloxane | Dow Corning Corporation |
| n-Butyl Propionate | Solvent | The Dow Chemical Company |
| n-Propyl Propionate | Solvent | The Dow Chemical Company |
| Methyl Isobutyl Ketone (MIBK) | Solvent | Honeywell Burdick-Jackson, a subsidiary of Honeywell International, Inc. |
| Z-6040 silane (glycidoxypropyl trimethoxy silane) | Silane adhesion promoter | Dow Corning Corporation |
| Dibutytin dilaurate (DBTDL) | Catalyst | Sigma-Aldrich Co. |

Test Procedures:

Pseudo-barnacle Pull Off Strength Test

The test was carried out according to a modified procedure as described in reference (Kohl JG & Singer I L, Pull-off behavior of epoxy bonded to silicone duplex coatings, Progress in Organic Coatings, 1999, 36:15-20) using an Instron machine under the trade designation Instron™ Model 1122. Ten-millimeter diameter aluminum studs were used and glued to the surface of the coated panels using an epoxy adhesive (Hysol® 1C from Henkel Loctite Americas, www.loctite.com). The excessive epoxy was trimmed after about one hour cure. The epoxy adhesive was then allowed to harden for at least three days at room temperature. The stud was then pulled off using an Instron machine until the stud detached from the coating surface. For each test, at least two and preferably three replicate samples were employed and the average value for pull off strength (measured in MPa units) was recorded. The threshold of pseudo-barnacle pull off strength was 0.6 MPa.

Contact Angle Test

The water contact angle of the coatings was measured using a VCA Optima contact angle measuring device from AST Products, Inc. A water droplet, 0.5-1 µl was placed on the coating surface. After the equilibrium time the contact angle was measured. A higher contact angle means the coating surface is hydrophobic. For a fouling release coating the contact angle should be ≥100°.

Impact Resistance

The impact resistance of the coating was determined by using a Gardner impact tester according to ASTM D2794. This test involves dropping a weight onto an indenter which is resting on the surface of the coating. The weight is dropped from a known height and the indenter forms a dimple in the coated panel. The coating is observed for cracking or delaminating on or around the dimple. The force to produce cracking/delaminating is recorded in inch-pounds (in-lb). The highest force that does not result in coating failure up to 160 in-lbs is recorded. The test is performed by impacting the coating directly (direct), coating facing upward. The threshold of impact resistance was 80 in-lbs.

Cross Hatch Adhesion

Cross hatch adhesion was measured according to ASTM D3359. A rating of 4B or 5B is considered an acceptable level of adhesion.

Adhesion—Hot Water Immersion

The cured panels were immersed in hot water (80° C.) for 5 days. Upon completion the panels were removed from the hot water bath, dried and allowed to cool to ambient lab temperatures. The coatings were visually inspected for delaminating, blistering, bubbling, etc. in the scribed area from the cross-hatch adhesion test. If no damage was observed, the top coat was rated as a pass for adhesion.

Coating Application & Cure

Coatings were applied to 4 inch by 12 inch aluminum chromate pre-treated and steel phosphate pre-treated panels using a wire wound rod or a 8 path wet film applicator. The panels were pre-cleaned by wiping with a lint free cloth and IPA to remove oils and dried with compressed air or nitrogen. The coated panels were allowed to cure for a minimum of 7 days at 50% relative humidity (RH) and ambient laboratory temperatures (~24° C.) prior to testing.

Formulations:

Examples 1-29 & Comparative Examples 1-3

The coating formulations were prepared in a FlackTek SpeedMixwer™ (Model DAC 150 FV-K, FlackTek, Inc.) dual asymmetric centrifuge. The formulations were prepared as follow:
1. A solvent blend was prepared from equal parts by weight of MIBK, n-butyl propionate, and n-propyl propionate unless another solvent was specified in the formulation tables
2. A 1% catalyst solution was prepared using the above solvent blend and 1% DBTDL
3. The polyols, solvents, and catalyst solution, and adhesion promoter (if present in formulation) were charged to a SpeedMixer cup
4. The blend was mixed for 30 seconds at ~3000 rpm
5. The isocyanate functional components were added to the SpeedMixer cup
6. The blend was mixed for 30 seconds at ~3000 rpm
7. Panels were coated and allowed to cure as described above

|  |  |  | Examples | | | | | |
|---|---|---|---|---|---|---|---|---|
| Material | Solids | Eq Wt | 1 G | 2 G | 3 G | 4 G | 5 G | 6 G |
| Acrylic Polyol A | 80.3 | 552 | 11 | | | 11 | | |
| Acrylic Polyol B | 76.4 | 551 | | 12 | | | 12 | |
| Acrylic Polyol C | 73.1 | 557 | | | 12 | | | 12 |
| Desmodur N3390 | 90 | 214 | 4.4 | 4.8 | 4.8 | 4.4 | 4.8 | 4.8 |
| Silmer NCO C-50 | 100 | 4133 | 1.5 | 1.5 | 1.5 | | | |
| Silmer NCO Di-100 | 100 | 3950 | | | | 1.4 | 1.5 | 1.5 |
| 1% DBTDL | 1 | | 0.3 | 0.3 | 0.3 | 0.3 | 0.3 | 0.3 |
| Solvent Blend | 0 | | 4.7 | 4.3 | 3.7 | 4.6 | 4.4 | 3.6 |

Testing Results for Examples 1-6

|  |  | Pseudo-Barnacle | Impact | |
|---|---|---|---|---|
| Example | Contact Angle | Adhesion MPa | Direct In-lbs | Indirect In-lbs |
| 1 | 107° | 0.18 | >160 | >160 |
| 2 | 109° | 0.23 | >160 | >160 |
| 3 | 106° | 0.23 | >160 | >160 |
| 4 | 106° | 0.11 | >160 | >160 |
| 5 | 106° | 0.12 | >160 | >160 |
| 6 | 106° | 0.16 | >160 | >160 |

These results illustrate that acrylic polyols of different glass transition temperatures yield coatings with excellent toughness as illustrated by the impact resistance results and release properties. They also illustrate that different level of isocyanate functionality on the PDMS polymers (Silmer C-50 is a tri-functional whereas Silmer Di-100 is di-functional) provide the same results. The level of isocyanate functional PDMS in these examples is 10% based on total solids in the formulation.

|  |  |  | Examples | | | | | |
|---|---|---|---|---|---|---|---|---|
| Material | Solids | Eq Wt | 7 G | 8 G | 9 G | 10 G | 11 G | 12 G |
| Acrylic Polyol A | 80.3 | 552 | 13 | 12.5 | 11 | 13.1 | 12.4 | 11 |
| Desmodur N3390 | 90 | 214 | 5.2 | 4.9 | 4.2 | 5.3 | 5 | 4.3 |
| Silmer NCO Di-50 | 100 | 2150 | 0.8 | 1.6 | 3.1 | | | |
| Silmer NCO Di-100 | 100 | 3950 | | | | 0.8 | 1.6 | 3.2 |
| 1% DBTDL | 1 | | 0.4 | 0.4 | 0.3 | 0.4 | 0.4 | 0.3 |
| Solvent Blend | 0 | | 4.2 | 5.2 | 6.9 | 4.2 | 5.2 | 7.1 |

Testing Results for Examples 7-12

|  |  | Pseudo-Barnacle | Impact | |
|---|---|---|---|---|
| Example | Contact Angle | Adhesion MPa | Direct In-lbs | Indirect In-lbs |
| 7 | 103° | 0.24 | >160 | >160 |
| 8 | 103° | 0.3 | >160 | >160 |
| 9 | 109° | 0.24 | >160 | >160 |
| 10 | 105° | 0.23 | >160 | >160 |
| 11 | 103° | 0.16 | >160 | >160 |
| 12 | 100° | 0.08 | >160 | >160 |

These results illustrate that different level of the isocyanate functional PDMS provide tough coatings (impact resistance) and good release properties. The range of isocyanate functional PDMS in these formulations is between 5-20% based on total solids in the formulation. They also highlight that different MW isocyanate functional PDMS polymers can be used: Silmer NCO Di-50 (MW 4300 g/mol) and Silmer NCO Di-100 (MW 8000 g/mol).

|  |  |  | Examples | | |
|---|---|---|---|---|---|
| Material | Solids | Eq Wt | 13 G | 14 G | 15 G |
| Acrylic Polyol A | 80.3 | 552 | 10.2 | 9.2 | 11 |
| Desmodur N3390 | 90 | 214 | 3.9 | 3.5 | 4.4 |
| Silmer NCO Di-100 | 100 | 3950 | 3.9 | 4.5 | 3.2 |
| 1% DBTDL | 1 | | 0.3 | 0.3 | 0.3 |
| Solvent Blend | 0 | | 7.9 | 8.6 | 7.1 |

Testing Results for Examples 13-15

|  |  | Pseudo-Barnacle | Impact | |
|---|---|---|---|---|
| Example | Contact Angle | Adhesion MPa | Direct In-lbs | Indirect In-lbs |
| 13 | 102° | 0.1 | >160 | 120 |
| 14 | 101° | 0.11 | >160 | 80 |
| 15 | 100° | 0.13 | >160 | 100 |

These results further expand the level of the isocyanate functional PDMS to provide tough coatings (impact resistance) and good release properties. The range of isocyanate functional PDMS in these formulations is between 20-30% of the totals solids in the formulation.

| Material | Solids | Eq Wt | Examples 16 G | 17 G |
|---|---|---|---|---|
| Acrylic Polyol D | 80.27 | 552 | 10.2 | 11 |
| Desmodur N3390 | 90 | 214 | 3.6 | 3.9 |
| Silmer NCO Di-100 | 100 | 3950 | 3.7 | 3 |
| 1% DBTDL | 1 | | 0.3 | 0.3 |
| Solvent Blend | 0 | | 6.9 | 6.8 |

Testing Results for Examples 16 and 17

| Example | Contact Angle | Pseudo-Barnacle Adhesion MPa | Impact Direct In-lbs | Indirect In-lbs |
|---|---|---|---|---|
| 16 | 103° | 0.24 | >160 | >160 |
| 17 | 101° | 0.26 | >160 | >160 |

This data confirms the earlier data at 20 and 25% isocyanate functional PDMS in the formulations using a new lot of Acrylic Polyol A, labeled Acrylic Polyol D (slightly higher OH equivalent weight) still illustrating excellent toughness (impact resistance) and release properties.

| Material | Solids | Eq Wt | Example 18 G | Example 19 G |
|---|---|---|---|---|
| Polyester 1 | 100 | 165 | 7.2 | 0 |
| Polyester 2 | 100 | 306.6 | 0 | 8 |
| Desmodur N3390 | 90 | 214 | 9.5 | 5.6 |
| Silmer NCO Di-100 | 100 | 3950 | 5.4 | 4.4 |
| 1% DBTDL | 1 | | 0.3 | 0.3 |
| Solvent Blend | 0 | | 13.1 | 10.9 |

Testing Results for Examples 18 and 19

| Example | Contact Angle | Pseudo-Barnacle Adhesion MPa | Impact Direct in/lbs |
|---|---|---|---|
| 18 | 105° | 0.2 | >160 |
| 19 | 121° | 0.57 | >160 |

This data confirms that polyols other than acrylic can be used. However, acrylic polyols are preferred.

| Material | Solids | Eq Wt | Examples 20 G | 21 G | 22 G | 23 G | 24 G | 25 G |
|---|---|---|---|---|---|---|---|---|
| Acrylic Polyol D | 77.5 | 609.7 | 4.5 | 4.5 | 4.5 | 4.5 | 11 | 10.2 |
| Desmodur N3390 | 90 | 214 | 1.6 | 1.6 | 1.6 | 1.6 | 3.9 | 3.6 |
| Silmer NCO Di-100 | 100 | 3950 | 1.7 | 1.7 | 1.7 | 1.7 | 3 | 3.7 |
| 1% DBTDL | 1 | | 0.1 | 0.1 | 0.1 | 0.1 | 0.3 | 0.3 |
| Solvent Blend | 0 | | 3.1 | 3.1 | 3.1 | 3.1 | 6.8 | 6.9 |

Testing Results for Examples 20-25

| Example | Overcoat Interval Hours | Pseudo-Barnacle Adhesion MPa | Cross Hatch Adhesion | Hot Water Adhesion |
|---|---|---|---|---|
| 20 | 24 | 0.32 | 5B | Pass |
| 21 | 48 | 0.29 | 5B | Pass |
| 22 | 72 | 0.23 | 5B | Pass |
| 23 | 96 | 0.31 | 5B | Pass |
| 24 | 168 | 0.2 | 5B | Fail |
| 25 | 168 | 0.23 | 5B | Fail |

Examples 20-25 demonstrate that a tie or mid coat layer is not required to achieve acceptable fouling release properties and adhesion to the primer. Examples 20-25 were prepared as described above and applied to treated metal panels that were primed with a commercial marine epoxy primer (Interguard 264 manufacturer by International Paint) per the manufacturer's recommendations. The primer was applied to the panels and allowed to cure for 24, 48, 72, 96, and 168 hours respectively (Ex 20-25—examples 24 & 25 applied after 168 hours—different levels of silicone) and allowed to cure as described above.

These examples demonstrate that excellent release properties can be achieved without the use of a tie or mid coat applied between a primer and the fouling release top coat. These results also show a preferred over coat window between applying the top coat over the primer between 24 and 144 hours, preferably between 24 and 120 hours, and more preferably between 48-96 hours with excellent adhesion as demonstrated by the hot water adhesion test.

| Material | Solids | Eq Wt | Examples 26 G | 27 G | 28 G | 29 G |
|---|---|---|---|---|---|---|
| Acrylic Polyol D | 77.5 | 609.7 | 4.2 | 4.2 | 4.2 | 4.2 |
| Desmodur N3390 | 90 | 214 | 1.4 | 1.5 | 1.5 | 1.5 |
| Silmer NCO Di-100 | 100 | 3950 | 1.6 | 1.6 | 1.6 | 1.6 |
| Z-6040 | 100 | | 0.2 | 0.2 | 0.2 | 0.2 |
| 1% DBTDL | 1 | | 0.1 | 0.1 | 0.1 | 0.1 |
| Solvent Blend | 0 | | 3.1 | 3.0 | 3.0 | 3.0 |

Testing Results for Examples 26-29

| Example | Overcoat Interval Hours | Pseudo-Barnacle Adhesion MPa | Cross Hatch Adhesion | Hot Water Adhesion |
|---|---|---|---|---|
| 26 | 24 | 0.32 | 5B | Pass |
| 27 | 48 | 0.24 | 5B | Pass |
| 28 | 72 | 0.26 | 5B | Pass |
| 29 | 96 | 0.25 | 5B | Pass |

Examples 26-29 demonstrate that a silane adhesion promoter can be used to further enhance the wet adhesion of the fouling release top coat without the need for a mid or tie coat.

Examples 24-27 were prepared as described above and applied to treated metal panels that were primed with a commercial marine epoxy primer (Interguard 264 manufacturer by International Paint) per the manufacturer's recommendations. The primer was applied to the panels and allowed to cure for 24, 48, 72 or 96 hours respectively (Ex 24-27). The nominal dry film thickness (DFT) of the primer was between 4-4.5 mils. The top coat was applied to achieve a DFT of >2.5 mils and allowed to cure as described above.

These examples demonstrate that excellent release properties can be achieved without the use of a tie or mid coat applied between a primer and the fouling release top coat with excellent adhesion as demonstrated by the hot water adhesion test when a silane adhesion promoter is added to the top coat formulation. Visually the panels for examples 26-29 looked better after the hot water adhesion test than those of examples 20-23. The range of silane adhesion promoter should be between 0.5-3% based on weight, preferably between 1-3% % based on weight, and more preferably between 1.5-3% based on weight.

Comparative Examples

The comparative examples below are 2K urethane systems. However they are differentiated from the present invention in performance and in cured coating composition.

|  |  |  | Comparative Examples | | |
| --- | --- | --- | --- | --- | --- |
|  |  |  | 1 | 2 | 3 |
| Material | Solids | Eq Wt | G | G | G |
| Polyester 3 | 90 | 201 | 5.5 | 5.5 | 5.5 |
| Tolanate IDT 70 | 70 | 343 | 10.50 | 10.6 | 10.8 |
| Siloxane 1 | 100 | 2500 | 1.40 | 0 | 0 |
| Siloxane 2 | 100 | 2000 | 0 | 1.4 | 0 |
| Siloxane 3 | 100 | 1200 | 0 | 0 | 1.4 |
| 1% DBTDL | 1 |  | 0.3 | 0.3 | 0.3 |
| n-butyl acetate | 0 |  | 3.4 | 3.4 | 3.5 |

Results for Comparative Examples 1-3

| Comparative Example | Contact Angle | Pseudo-Barnacle Adhesion MPa | Cross Hatch Adhesion | Hot Water Adhesion |
| --- | --- | --- | --- | --- |
| 1 | 91° | 0.06 | 5B | Fail |
| 2 | 74° | 0.13 | 5B | Fail |
| 3 | 50° | 0.02 | 5B | Fail |

None of the contact angles met the threshold for a fouling release coating exhibiting a water contact angle of ≥100°. The coating quality for each of the comparative examples was extremely poor due to severe blooming of the siloxane component that could be easily wiped from the surface. Although the pseudo-barnacle adhesion meets the requirement, none of the coatings passed the hot water adhesion test after immersion—all of the coating severely delaminated from the substrate and cracked. These comparative examples highlight the performance advantages of the present invention compared to other 2K urethane fouling release technologies, by exhibiting better adhesion without a mid or tie coat and better coating quality.

The invention claimed is:

1. A two-part moisture curable composition comprising:
   (a) a first part comprising at least one multifunctional polyol;
   (b) a second part comprising: (i) at least one polysiloxane polymer with at least two isocyanate functional groups and (ii) at least one isocyanate functional organic compound; and
   (c) solvent;

wherein the polysiloxane polymer is:
(i) a di-functional polysiloxane with the formula:

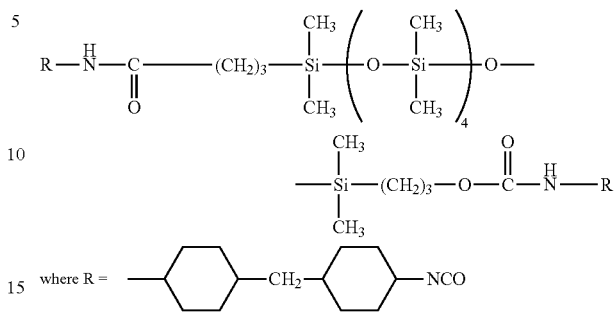

where a≥1; or
(ii) a multi-functional polysiloxane with the formula:

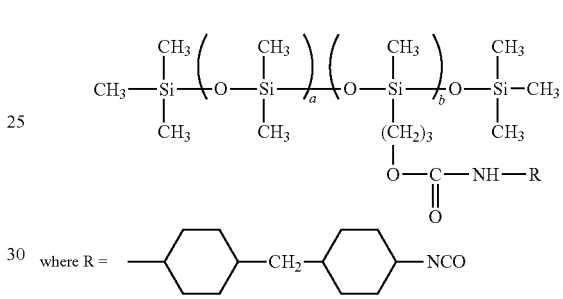

where a ≥1 and b >1.

2. The composition of claim 1 wherein the polysiloxane polymer has a number average molecular weight in the range of from 4,000 to 15,000.

3. The composition of claim 1 wherein the polysiloxane polymer is from 2 to 40 weight percent based on the total solids weight of the curable composition.

4. The composition of claim 1 wherein the multifunctional polyol is selected from the group consisting of acrylic polyols, natural oil polyols, polyester polyols, polyether polyols, polycarbonate polyols, and blends thereof.

5. The composition of claim 1 wherein the multifunctional polyol is an acrylic polymer with a Tg in the range of from 0° C. to 45° C. and a number average molecular weight in the range of from 2,000 g/mol to 25,000 g/mol.

6. The composition of claim 1 wherein the multifunctional polyol is from 35 to 60 weight percent based on the total weight of the curable composition.

7. The composition of claim 1 wherein the isocyanate functional organic compound is selected from the group consisting of hexamethylene diisocyanate (HDI), isophorone diisocyanate (IPDI), methylene bis(p-cyclohexyl isocyanate) ($H_{12}$MDI), meta-tetramethylxylene diisocyanate (m-TMXDI), cyclohexyl diisocyanate (CHDI), 1,3-bis(isocyanatomethyl)cyclohexane, 1,4-bis(isocyanatomethyl)cyclohexane, trimers of diisocyanates, and blends thereof.

8. The composition of claim 1 wherein the isocyanate functional organic compound is from 8 to 30 weight percent based on the total weight of the curable composition.

9. The composition of claim 1 further comprising one or more of pigments, dyes, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations thereof.

10. The composition of claim 9 wherein the adhesion promoter is 3-glycidoxypropyl trimethoxysilane.

11. The composition of claim 1 wherein:
(a) the polysiloxane polymer is from 2 to 40 weight percent based on the total solids weight of the curable composition and has a number average molecular weight in the range of from 4,000 to 15,000;
(b) the multifunctional polyol is from 35 to 60 weight percent based on the total weight of the curable composition and is an acrylic polymer with a Tg in the range of from 0° C. to 45° C. and a number average molecular weight in the range of from 2,000 g/mol to 25,000 g/mol; and
(c) the isocyanate functional organic compound is from 8 to 30 weight percent based on the total weight of the curable composition and is selected from the group consisting of hexamethylene diisocyanate (HDI), isophorone diisocyanate (IPDI), methylene bis(p-cyclohexyl isocyanate) ($H_{12}MDI$), meta-tetramethylxylene diisocyanate (m-TMXDI), cyclohexyl diisocyanate (CHDI), 1,3-bis(isocyanatomethyl)cyclohexane, 1,4-bis(isocyanatomethyl)cyclohexane, trimers of diisocyanates, and blends thereof.

12. A method of coating a substrate comprising:
(a) forming a two-part moisture curable composition comprising:
(i) a first part comprising at least one multifunctional polyol;
(i) a second part comprising: (A) at least one polysiloxane polymer with at least two isocyanate functional groups and (B) at least one isocyanate functional organic compound; and
(ii) solvent;
(a) optionally blending in one or more of pigments, dyes, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations thereof;
(b) applying the composition of steps (a) and (b) to a substrate and curing the composition;
wherein the polysiloxane polymer is:
(i) a di-functional polysiloxane with the formula:

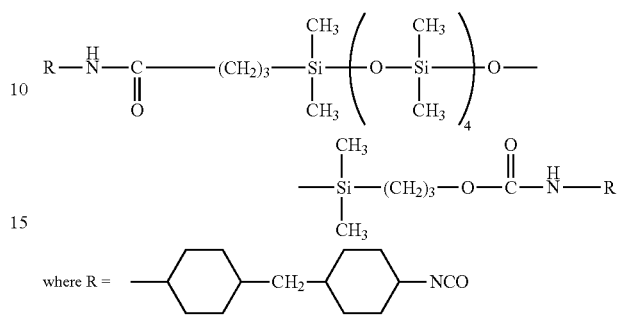

where $a \geq 1$; or
(ii) a multi-functional polysiloxane with the formula:

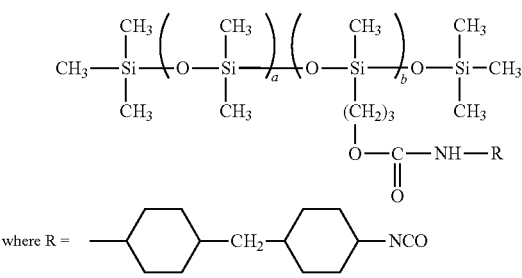

where $a \geq 1$ and $b > 1$.

13. A coated article made by the method of claim 12.

14. The coated article of claim 13 having a nominal dry film thickness (DFT) of the coating greater than or equal to 2 mils.

* * * * *